UNITED STATES PATENT OFFICE.

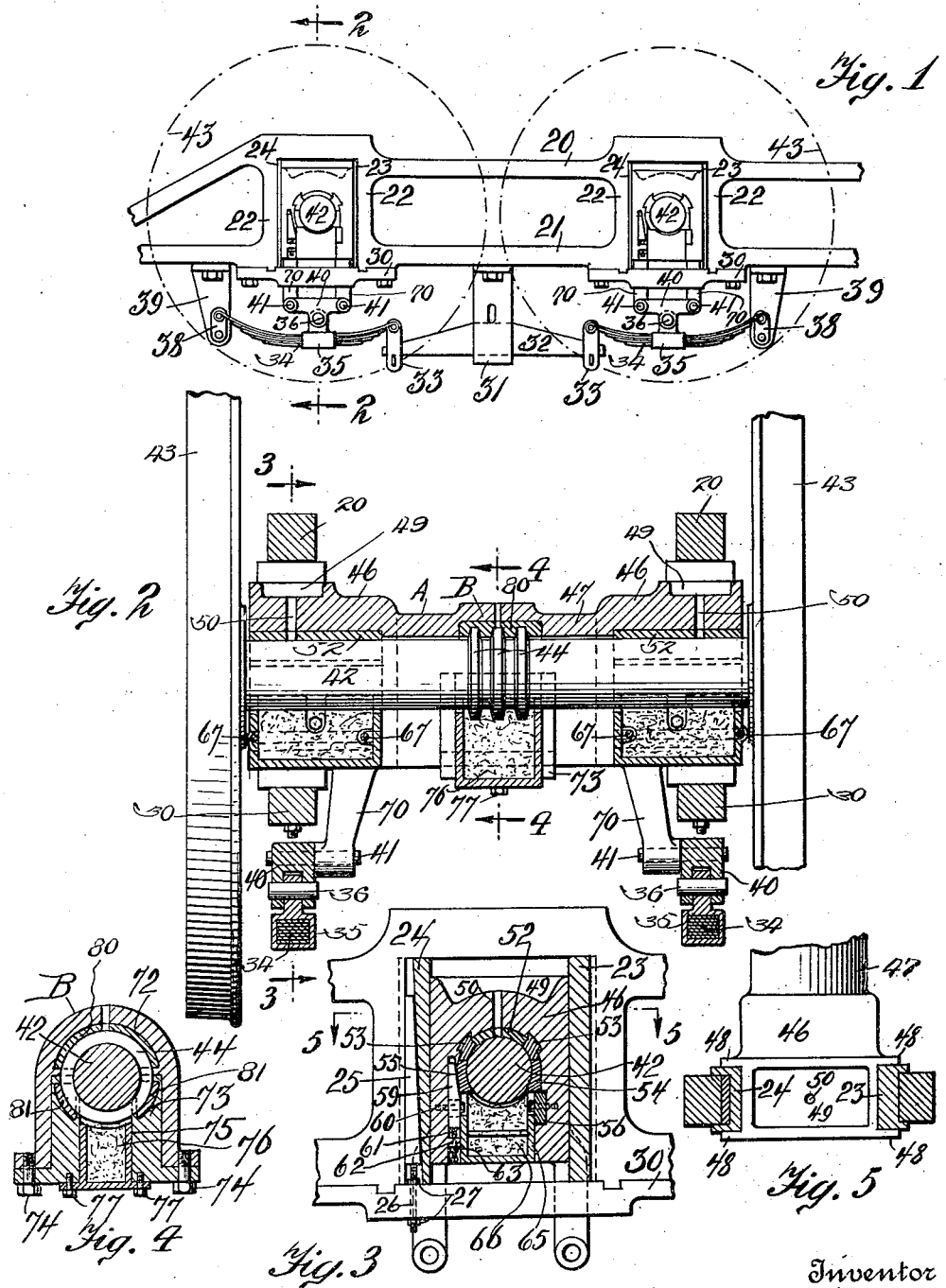

JOHN C. WALDRON, OF BROOKLYN, NEW YORK.

CONNECTED DRIVING BOX.

1,415,419.  Specification of Letters Patent.  Patented May 9, 1922.

Application filed July 12, 1920. Serial No. 395,719.

*To all whom it may concern:*

Be it known that I, JOHN C. WALDRON, citizen of the United States, and resident of the borough of Brooklyn, city of New York, in the county of Kings and State of New York, have invented certain new and useful Improvements in Connected Driving Boxes, of which the following is a specification.

This invention relates to connected driving boxes, which are particularly applicable to locomotive axles, but may be used for axles for other vehicles.

The organization of the invention comprises a pair of heads which take the place of the independently operating driving boxes heretofore used. The heads are fitted with brasses or other suitable bearings for the axles with which they are used and are connected by a U shaped member. A thrust bearing is formed in the said member which coacts with thrust collars on the axle.

The movements of one head are transmitted to the other to cause them to move in unison. By this means the often detrimental effect of the driving wheels of the locomotive on railroad tracks are to a great extent avoided. The heads of the connected driving boxes with this construction can be made much longer than the widths of the main frames of the locomotive and thereby insures a much greater bearing surface for the axle. The rigid connection of the two heads also allows an easy alignment of their wearing surfaces.

Fig. 1 represents a front elevation of the connected driving boxes with a locomotive frame; Fig. 2 shows a section of Fig. 1 on the line 2, 2 on an enlarged scale; Fig. 3 is a section of Fig. 2 on the line 3, 3; Fig. 4 represents a section of Fig. 2 on the line 4, 4 and Fig. 5 is a section of Fig. 3 on the line 5, 5.

A fragmentary portion of the main frames of a locomotive are each indicated with the upper members 20, the lower members 21 and which have formed therewith the pedestals having the vertical members 22. Shoes 23 and 24 are provided for the pedestals. A wedge 25 maintains the shoe 24 in proper position and a bolt 26 with lock nuts 27 is provided for the wedge 25. Pedestal binders are indicated at 30. Equalizer fulcrum brackets 31 are bolted to the members 21 for the spring equalizers 32. Spring hangers 33 extend between one end of the springs 34 and the said equalizers. A strap 35 with a pivot 36 encircles each spring 34. Hangers 38 extend between the other ends of the springs 34 and the brackets 39, which latter are connected to the members 21 of the frames. An equalizer bar 40 has the central bearing for the pivot 36 and the end pivots 41. Axles 42 are indicated with their driving wheels 43 and the thrust collars 44.

The driving boxes are indicated in their entirety by the letter A and comprise each a pair of U shaped heads 46 which are connected by a U shaped member 47. The heads 46 are longer than the thickness of the ordinary driving box and extend beyond the side faces of the main frames of the locomotive. The heads 46 have each formed therewith the flanges 48 that engage the shoes 23 and 24. The top of each head has formed therewith a waste cavity 49 with the oil hole 50. A crown brass 52 which bears on the axle 42 is provided for each head 46. Side brasses 53 for the axles are located at the ends of the crown brasses 52 and are dovetailed in the head 46. Side brasses 54 and 55 for the axle 42 extend below the side brasses 53. A supporting bar 56 is secured in each head 46 and supports the side brass 54. A wedge 59 bears against the back face of each brass 55 and is held in proper position by means of bolts 60 and 61. The latter is in threaded engagement with a lug 62 of each head. A lock nut 63 is provided for each bolt 61. A waste box 65 for the oil waste 66 is supported in each head 46 by the usual pins 67.

Legs 70 extend from the heads 46 and have pinned thereto the equalizer bars 40 by means of the pivots 41. In the middle portion of each U shaped member 47 is formed a thrust bearing B for the thrust collars 44. The thrust bearing comprises the upper member 72 which is a portion of the U shaped member 47 and the lower detachable member 73. The latter is connected to the upper member by means of the bolts 74. In an opening 75 of the member 73 is located a waste box 76 which is secured in place by means of the bolts 77. A detachable bearing 80 for the thrust collar 44 is located in the member 72 and detachable bearings 81 are located in the member 73.

By means of the connected driving boxes the movements of one head coact with the movements of the other and side thrust is taken up by the thrust bearings in the middle portions of the axles.

Having described my invention what I desire to secure by Letters Patent and claim is:

1. The combination in connected driving boxes of a pair of heads, bearings for an axle in said heads, a U shaped member connecting said heads and a thrust bearing for said axle in said U shaped member.

2. The combination with connected driving boxes of a pair of heads, each of said heads having extending therefrom a pair of legs, a U shaped member connecting the heads, an equalizer bar pivoted to the pair of legs and equalizing appurtenances coacting with the equalizer bar.

3. The combination with connected driving boxes for a vehicle of a pair of heads, a member connecting the heads, brasses in each head constituting bearings, a thrust bearing in the connecting member, an axle of the vehicle for said bearings, thrust collars for the axle coacting with the thrust bearing of the connecting member and means connected to the heads coacting with equalizing appurtenances of the vehicle.

4. The combination with connected driving boxes for a vehicle of a pair of heads, a member connecting the heads, an axle for the vehicle extending through the heads, a crown brass in each head for the axle, a pair of side brasses dovetailed in each head adjacent to the side edges of the crown brass, a second pair of side brasses next adjacent to the first side brasses for said axle, a rigid support for one of the latter side brasses and an adjustable support for the other one of the latter side brasses.

5. The combination with connected driving boxes for a vehicle of a pair of heads, a member connecting the heads, an axle for the vehicle extending through the heads, a crown brass in each head for the axle, a pair of side brasses dovetailed in each head adjacent to the side edges of the crown brass, a second pair of side brasses next adjacent to the first side brasses for said axle, a rigid support for one of the latter side brasses and an adjustable wedge in the head for the other one of the adjustable brasses.

Signed at the borough of Manhattan, city of New York, in the county of New York and State of New York, this 30th day of June, A. D. 1920.

JOHN C. WALDRON.